United States Patent
Hayat et al.

(10) Patent No.: US 11,970,610 B2
(45) Date of Patent: Apr. 30, 2024

(54) TIRE RUBBER COMPOSITION USING PYRAZALONE-BASED COMPOUND

(71) Applicant: The Goodyear Tire & Rubber Company, Akron, OH (US)

(72) Inventors: Jeffery Hakim Hayat, Uniontown, OH (US); Robert Vincent Dennis-Pelcher, Uniontown, OH (US)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 110 days.

(21) Appl. No.: 17/546,271

(22) Filed: Dec. 9, 2021

(65) Prior Publication Data
US 2023/0183457 A1   Jun. 15, 2023

(51) Int. Cl.
| C08L 7/00 | (2006.01) |
| B60C 1/00 | (2006.01) |
| C08K 3/04 | (2006.01) |
| C08K 5/00 | (2006.01) |
| C08K 5/057 | (2006.01) |
| C08K 5/3445 | (2006.01) |

(52) U.S. Cl.
CPC ............. *C08L 7/00* (2013.01); *B60C 1/0016* (2013.01); *B60C 1/0041* (2013.01); *C08K 3/04* (2013.01); *C08K 5/0091* (2013.01); *C08K 5/057* (2013.01); *C08K 5/3445* (2013.01)

(58) Field of Classification Search
CPC .... C08K 5/0091; C08K 5/057; C08K 5/3445; C08K 3/04
See application file for complete search history.

(56) References Cited

U.S. PATENT DOCUMENTS

| 4,789,701 | A | 12/1988 | Taylor |
| 7,601,772 | B2 | 10/2009 | Fudemoto et al. |
| 8,975,316 | B2 | 3/2015 | Belmont et al. |
| 9,663,637 | B2 | 5/2017 | Luo et al. |
| 10,087,306 | B2 * | 10/2018 | Puhala ...................... C08K 3/36 |
| 2020/0130306 | A1 | 4/2020 | Kramer et al. |
| 2020/0283610 | A1 | 9/2020 | Kulig |
| 2022/0106463 | A1 * | 4/2022 | Aoyagi ................. B60C 1/0016 |

FOREIGN PATENT DOCUMENTS

| CN | 106221055 A | | 12/2016 | |
| CN | 112358693 A | | 2/2021 | |
| EP | 3702523 A1 | | 9/2020 | |
| EP | 3730498 A1 | | 10/2020 | |
| EP | 3845591 A1 | | 7/2021 | |
| JP | 2020100820 A | | 7/2020 | |
| KR | 2021120314 A | * | 10/2021 | ............... B60C 1/00 |
| WO | WO-03060002 A1 | * | 7/2003 | ............. B61D 17/22 |
| WO | 2011045463 A1 | | 4/2011 | |
| WO | 2020045575 A1 | | 3/2020 | |

OTHER PUBLICATIONS

Machine translation of KR 20210120314 (2021, 7 pages).*

* cited by examiner

*Primary Examiner* — Brieann R Johnston
(74) *Attorney, Agent, or Firm* — Mandy B. Willis

(57) ABSTRACT

The present invention is directed to a tire layer (e.g., tire tread or carcass layer) having a rubber composition including a pyrazolone-based compound in combination with reinforcing filler material and optionally a processing aid, and tires using the same, that provides desirable tire performance properties, such as improvements in tear strength without negatively impacting stiffness or hysteresis. In one embodiment, the tire layer includes a rubber composition having an elastomer (e.g., natural or isoprene rubber), a pyrazolone-based compound, reinforcing filler selected from carbon black only, carbon black/silica blends only, or graphene, functionalized graphene, carbon nanotubes, functionalized carbon nanotubes or mixtures thereof further optionally with carbon black, and an optional processing aid, such as a metal glycerolate, in desirable amounts to provide enhanced tear strength without negatively impacting stiffness or hysteresis.

18 Claims, 1 Drawing Sheet

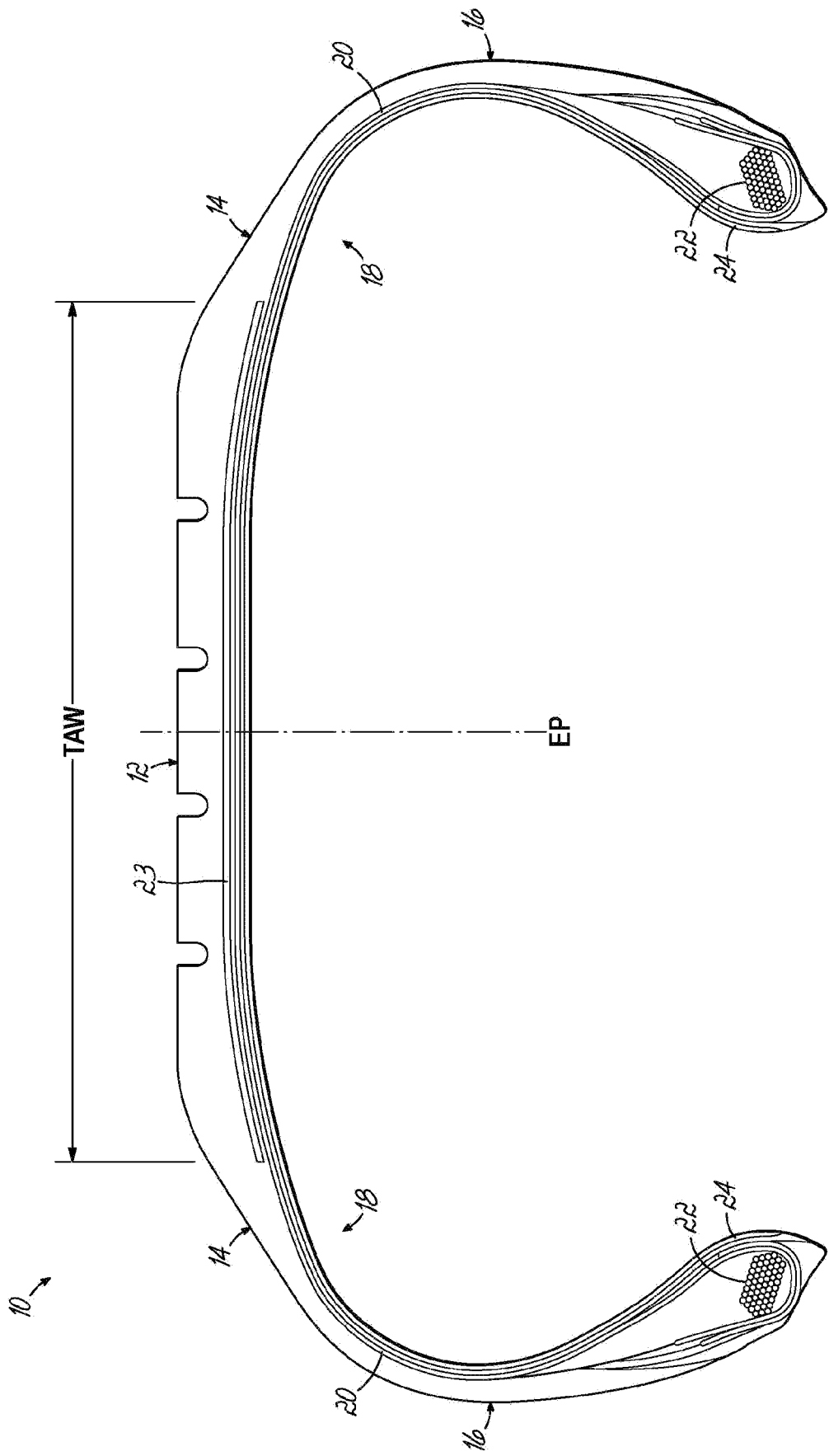

TIRE RUBBER COMPOSITION USING PYRAZALONE-BASED COMPOUND

FIELD OF THE INVENTION

The present invention is directed to a tire layer (e.g., tire tread or carcass layer) having a rubber composition including a pyrazolone-based compound in combination with reinforcing filler and optionally a processing aid for improved tear strength while maintaining cured stiffness and tires using the same.

BACKGROUND OF THE INVENTION

Generally, improved tire performance, such as by way of improved tire layers (e.g., tire tread and/or tire carcass layers), has been identified as one primary technical challenge faced by tire manufacturers. However, it has traditionally been difficult to improve a tire's performance, such as rolling resistance and tear properties, for example, without compromising one or more of the other tire properties, including stiffness. A fundamental understanding of the causes behind this performance tradeoff could present opportunities to explore new materials technologies, which allow the tradeoff to be overcome, to meet product performance needs.

Overall, tire tread characteristics, such as traction, stiffness, tear, tread wear, and rolling resistance, are dependent to a large extent on the dynamic viscoelastic properties of the elastomers utilized in making up a tire. But these tire properties are also affected by the fillers (e.g., carbon black and/or silica) and/or other additives that are used in preparing the rubber compositions that make up the tire tread. For example, it is known that silica fillers may improve rubber properties, such as increased tear resistance, reduced rolling resistance, and increased road traction, and thus improve fuel economy for vehicles. But some difficulties encountered with silica-filled rubber compositions can include difficult dispersibility and deagglomeration of the silica filler, unfavorable green viscosity, and required use of coupling agents, such as polysulferized alkoxysilanes, many of which produce significant VOC by-products and/or have unfavorable vulcanization kinetics.

Furthermore, much effort has been expended over the years to modify the surface chemistry of fillers and/or the elastomers utilized in the rubber layers of the tire, such as to produce functionalized fillers and/or functionalized elastomers in an effort to improve coupling between the polymer and filler, which can result in improved tire performance. However, functionalizing fillers and/or elastomers can be timely, costly, and/or unpredictable. And while a tire property may be improved, it oftentimes happens to the detriment of another property(ies). For instance, while rolling resistance and/or tear strength may improve, stiffness can undesirably decrease. As such, further improvements in tire layers, particularly tire layer compositions, are continually being sought out.

Accordingly, new rubber compositions, such as improved tire tread and/or carcass layer compositions (and tires with the same), that provide desirable tire performance properties, such as improvements in rolling resistance and/or tear strength without negatively impacting stiffness, for example, are needed.

SUMMARY OF THE INVENTION

The present invention is directed to a tire layer (e.g., tire tread or carcass layer) having a rubber composition including a pyrazolone-based compound in combination with reinforcing filler and optionally a processing aid, and tires using the same, that provides desirable tire performance properties, such as improvements in tear strength without negatively impacting stiffness while generally maintaining rolling resistance.

In one example, the pyrazolone-based compound can include a derivative of 5-pyrazolone, such as 3-methyl-5-pyrazolone, that can be combined with a specified reinforcing filler(s), such as a dual filler system (e.g., carbon black/silica blends), full carbon black, graphene, functionalized graphene, carbon nanotubes, or functionalized carbon nanotubes, for example, and optionally further with a processing aid, which can include a metal glycerolate (e.g., zinc glycerolate).

In one embodiment, a pneumatic tire is provided that includes a tire layer having a rubber composition that includes 100 parts of one or more rubbers wherein the one or more rubbers is the total amount of rubber for the rubber composition. The rubber composition further includes a pyrazolone-based compound represented by the following Formula (1), or a salt thereof:

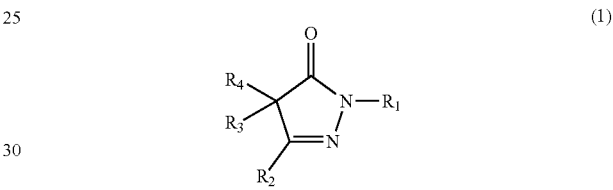

where $R_1$, $R_2$, $R_3$, and $R_4$ are the same or different, and each represents a hydrogen atom, an alkyl group, an aralkyl group, an aryl group, or a heterocyclic group; $R_3$ and $R_4$ may be taken together to form an alkylidene group, and $R_2$, $R_3$, and $R_4$ may be taken together to form an alkylene group; and each of these groups may have one or more substituents, wherein the pyrazolone-based compound is present in the rubber compound in an amount from about 0.1 to about 10 phr. The rubber composition also includes reinforcing filler selected from carbon black only, carbon black/silica blends only, or graphene, functionalized graphene, carbon nanotubes, functionalized carbon nanotubes, or mixtures thereof further optionally with carbon black wherein the total amount of reinforcing filler is from about 2 to about 300 phr.

In another embodiment, a pneumatic tire is provided that includes a tire layer selected from a tire tread or carcass layer, the tire layer including a rubber composition having 100 parts of natural rubber or isoprene rubber and a pyrazolone-based compound represented by the following Formula (1), or a salt thereof:

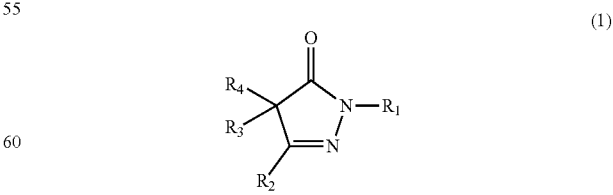

where $R_1$ represents a hydrogen atom, $R_2$ represents a hydrogen atom or a C1-4 linear alkyl group, and $R_3$ and $R_4$ are both hydrogen atoms. The rubber composition further includes reinforcing filler selected from carbon black only, carbon black/silica blends only, or graphene, functionalized graphene, carbon nanotubes, functionalized carbon nanotubes, or mixtures thereof further optionally with carbon black, and a processing aid represented by the following Formula (2):

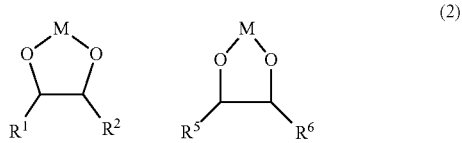

where M is selected from the group consisting of zinc, calcium, and magnesium, and $R^5$ is a hydrogen atom and $R^6$ is a hydroxyl substituted alkyl.

In another embodiment, a tire layer for a pneumatic tire is provided, the tire layer includes a rubber composition having 100 parts of one or more rubbers wherein the one or more rubbers is the total amount of rubber for the rubber composition and a pyrazolone-based compound represented by the following Formula (1), or a salt thereof:

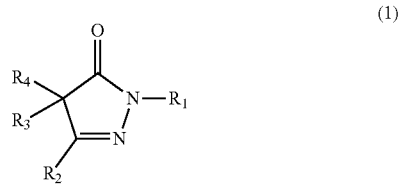

where $R_1$, $R_2$, $R_3$, and $R_4$ are the same or different, and each represents a hydrogen atom, an alkyl group, an aralkyl group, an aryl group, or a heterocyclic group; $R_3$ and $R_4$ may be taken together to form an alkylidene group, and $R_2$, $R_3$, and $R_4$ may be taken together to form an alkylene group; and each of these groups may have one or more substituents, wherein the pyrazolone-based compound is present in the rubber compound in an amount from about 1 to about 10 phr. The rubber composition further includes reinforcing filler selected from carbon black only, carbon black/silica blends only, or graphene, functionalized graphene, carbon nanotubes, functionalized carbon nanotubes, or mixtures thereof further optionally with carbon black, wherein the total amount of reinforcing filler is from about 2 to about 300 phr, and an optional processing aid represented by the following Formula (2):

where M represents a divalent metal, and $R^1$ and $R^2$ can be the same or different and are selected from the group consisting of hydrogen atoms, alkyl groups, alkylene groups, hydroxyl substituted alkyl or alkylene groups, amine substituted alkyl or alkylene groups, and thiol substituted alkyl or alkylene groups.

By virtue of the foregoing, there is provided a tire layer (e.g., tire tread or carcass layer) having a rubber composition including a pyrazolone-based compound with a reinforcing filler and optionally a processing aid, and tires using the same, that can improve tear strength without negatively impacting stiffness while generally maintaining rolling resistance, for example.

BRIEF DESCRIPTION OF THE DRAWINGS

The accompanying drawings, which are incorporated in and constitute a part of this specification, illustrate embodiments of the invention and, together with the general description of the invention given above, and detailed description given below, serve to explain the invention.

FIG. 1 is a cross-sectional view of a pneumatic tire with fiber-reinforced rubber layer in accordance with an embodiment of the present invention.

DETAILED DESCRIPTION

Tires and tire tread compositions are disclosed in various embodiments. However, one skilled in the relevant art will recognize that the various embodiments may be practiced without one or more of the specific details, or with other replacement and/or additional methods, materials, or components. In other instances, well-known structures, materials, or operations are not shown or described in detail to avoid obscuring aspects of various embodiments of the invention.

Similarly, for purposes of explanation, specific numbers, materials, and configurations are set forth in order to provide a thorough understanding of the invention. Nevertheless, the invention may be practiced without specific details.

Reference throughout this specification to "one embodiment" or "an embodiment" or variation thereof means that a particular feature, structure, material, or characteristic described in connection with the embodiment is included in at least one embodiment of the invention, but do not denote that they are present in every embodiment. Thus, the appearances of the phrases such as "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Additionally, it is to be understood that "a" or "an" or "at least one" may be used interchangeably and mean "one or more" unless explicitly stated otherwise.

Various operations will be described as multiple discrete operations in turn, in a manner that is most helpful in understanding the invention. However, the order of description should not be construed as to imply that these operations are necessarily order dependent. In particular, these operations need not be performed in the order of presentation. Operations described may be performed in a different order than the described embodiment. Various additional operations may be performed and/or described operations may be omitted in additional embodiments.

In the description of this invention, the terms "rubber" and "elastomer" where used herein, are used interchangeably, unless otherwise prescribed. The terms "rubber composition," "compounded rubber," and "rubber compound," where used herein, are used interchangeably to refer to "rubber which has been blended or mixed with various ingredients." The term "compound" relates to a "rubber composition" unless otherwise indicated. In addition, the term "phr" refers to parts of a respective material per hundred parts by weight of rubber or elastomer FIG. 1 shows a simplified cross-section of a tire 10 (e.g., pneumatic tire) that includes an outer tire tread 12, which has a rubber composition with a pyrazolone-based compound in accordance with an embodiment of the invention, and a pair of sidewalls 16 wherein the sidewalls 16 are connected to the tire tread 12 by shoulder regions 14. The outer circumferential tire tread 12 is adapted to be ground contacting when the tire 10 is in use. The shoulder regions 14 extend predominantly axially outwardly from the outer tire tread 12. The sidewalls 16 extend predominantly radially inwardly from the shoulder regions 14. FIG. 1 also illustrates the equatorial plane (EP") and the Tread Arc Width ("TAW") of the tire 10

A carcass 18 of the tire 10 can include one or more continuous carcass layers, such as radial plies 20 extending from side to side. The carcass 18 is located radially inwardly from the tread 12 and axially inwardly from the sidewalls 16. The carcass 18 acts as a supporting structure for components located axially or radially outwardly from the carcass 18, such as the tread 12 and sidewalls 16. The one or more radial plies 20 may include cords or reinforcing wires of, for example, steel, nylon, polyester, rayon, glass, etc., embedded in a rubber matrix. Carcass 18 of the tire has a pair of axially spaced bead wires 22 around which are wrapped the distal ends of the radial plies 20. The bead wires 22 may include, for example, substantially inextensible coils made of round metal filaments.

The tire 10 further includes at least one circumferential belt ply 23 that is situated between the tire tread 12 and carcass 18. The belt ply 23 can be composed of continuous cord reinforcement, which may include materials conventionally used by those having skill in the art such as, for example, metallic wire (e.g., steel), glass, polyester, nylon, aramid, or other reinforcing material. The cords of the belt ply 23 may also include a plurality of plies of different yarns, e.g., nylon and aramid, which can be helically twisted to form a cable.

In one embodiment, the tire 10 further includes an optional inner liner (or air barrier layer) 24 disposed radially inwardly from the carcass 18. The optional rubber tire inner liner 24 may be any known rubber inner liner for use in pneumatic tires 10. In one example, the rubber inner liner 24 can be a non-butyl general purpose rubber (GPR). In another example, the rubber inner liner 24 can be a sulfur curative-containing halobutyl rubber composition of a halobutyl rubber such as for example chlorobutyl rubber or bromobutyl rubber. Such tire halobutyl rubber based inner liner layer may also contain one or more sulfur curable diene-based elastomers such as, for example, cis 1,4-polyisoprene natural rubber, cis 1,4-polybutadiene rubber and styrene/butadiene rubber, or mixtures thereof. Rubber inner liner 24 is typically prepared by conventional calendering or milling techniques such as to form a strip of uncured compounded rubber of appropriate width. When the tire 10 is cured, the rubber inner liner 24 becomes an integral, co-cured, part of the tire 10. Tire inner liners, like that of rubber inner liner 24, and their methods of preparation are well known to those having skill in such art.

The tire tread 12, and thus the tire 10, in accordance with embodiments of the invention, incorporate elastomer or rubber compositions including at least each of the following components: (A) an elastomer, (B) a reinforcing filler, (C) a pyrazolone-based compound, and (D) optionally a processing aid. In another embodiment, the rubber composition may be utilized in another tire layer, including in a carcass layer, such as the radial ply 20, or in the belt ply 23.

(A) Elastomer/Rubber Component

The rubber component can include natural rubber (NR), synthetic diene rubber, and a mixture of natural rubber and synthetic diene rubber, and non-diene rubber other than these types of rubber. A wide variety of non-diene rubber can be used as the non-diene rubber.

Examples of natural rubber include natural rubber latex, technically specified rubber (TSR), ribbed smoked sheet (RSS), gutta-percha, Chinese gutta-percha (*Eucommia ulmoides*)-derived natural rubber, guayule-derived natural rubber, Russian dandelion (*Taraxacum kok-saghyz*)-derived natural rubber, and the like. Examples of natural rubber according to the present invention further include rubber obtained by modifying these types of natural rubber, such as epoxidated natural rubber, methacrylic acid modified natural rubber, and styrene modified natural rubber.

Examples of synthetic diene rubber include styrene-butadiene copolymer rubber (SBR), butadiene rubber (BR), isoprene rubber (IR), nitrile rubber (NBR), chloroprene rubber (CR), ethylene-propylene-diene terpolymer rubber (EPDM), styreneisoprene-styrene triblock copolymer (SIS), styrene-butadienestyrene triblock copolymer (SBS), and the like, and modified synthetic diene rubber thereof. Examples of modified synthetic diene rubber include main-chain-modified, one-terminal-modified, both-terminal-modified, or like modified diene rubber. Examples of functional groups of modified synthetic diene rubber include functional groups, such as epoxy, amino, alkoxysilyl, and hydroxyl groups. One or two or more kinds of these functional groups may be included in modified synthetic diene rubber.

The rubber component can be used singly, or as a mixture (blend) of two or more. In one example, the rubber component is natural rubber, IR, SBR, BR, or a mixture of two or more of these types of rubber. In another example, the rubber component is natural rubber, SBR, BR, or a mixture of two or more of these types of rubber. In another example, the rubber is natural rubber or IR. In one example, the rubber component is not functionalized.

The method for producing a synthetic diene rubber is not particularly limited. Examples of the production method include emulsion polymerization, solution polymerization, radical polymerization, anionic polymerization, cationic polymerization, and the like. The glass transition point of the synthetic diene rubber is also not particularly limited. The cis/trans/vinyl ratio of the double-bond portion of the natural rubber or synthetic diene rubber is not particularly limited, and any ratio is suitable. The number average molecular weight and molecular weight distribution of the diene rubber are not particularly limited. The diene rubber preferably has a number average molecular weight of 500 to 3000000, and a molecular weight distribution of 1.5 to 15.

(B) Reinforcing Filler

In one example, the reinforcing filler can include carbon black, silica, graphene, functionalized graphene, carbon nanotubes, functionalized carbon nanotubes, or mixtures thereof. In one example, the reinforcing filler can include a dual filler system including carbon black/silica blends. In another example, the reinforcing filler includes only one type of the aforementioned types of reinforcing filler, such as full carbon black, i.e., carbon black only. In one example, the rubber composition excludes silica. In another example, the reinforcing filler includes graphene, functionalized graphene, carbon nanotubes, functionalized carbon nanotubes, or mixtures thereof.

The carbon black can include, for example, commercially available carbon black, carbon-silica dual phase fillers, and the like. Specific examples of carbon black include high-, middle-, or low-structure SAF, ISAF, IISAF, N110, N121, N134, N220, N234, N330, N326, N339, N375, N550, HAF, FEF, GPF, or SRF-grade carbon black, and the like. There is no particular limitation on the DBP absorption of the carbon black. In one example, the carbon black has a DBP absorption of 60 to 200 cm$^3$/100 g. In another example, the carbon black has a nitrogen adsorption specific surface area (N$^2$SA, measured according to JIS K6217-2: 2001) of 30 to 200 m$^2$/g. In one example, the carbon black is not functionalized.

The amount of the carbon black in the rubber composition can be from 2 to 200 phr. In another example, the amount can be from about 10 phr to 130 phr or from about 10 phr to about 80 parts phr. In another example, the amount can be from about 20 phr to about 50 phr. In one example, the only reinforcing filler is carbon black.

The silica can include any type of commercially available products. In one example, the silica can include wet silica, dry silica, or colloidal silica. In another example, the silica can include pyrogenic siliceous pigments, precipitated siliceous pigments, and highly dispersible precipitated silicas. The silica can be pre-treated such as via a coupling agent. The silica can have an average particle size that is within the range of about 4 nm to 120 nm. The BET specific surface area of silica is not particularly limited and may be, for example, in the range of 40 to 350 m$^2$/g or within the range of about 125 m$^2$/g to about 250 m$^2$/g. The BET specific surface area is measured according to ISO 5794/1. The silica may also be typically characterized by having a dibutylphthalate (DBP) absorption value in a range of about 100 to about 400 ml/100 g. In one example, the silica is not functionalized.

The amount of silica can be equal to the amount of carbon black in the rubber composition. In one example, the amount of silica can be from 2 to 200 phr. In another example, the amount can be from about 10 phr to 130 phr or from about 10 phr to about 60 parts phr. In another example, the amount can be from about 20 phr to about 50 phr.

Graphene, functionalized graphene, carbon nanotubes, functionalized carbon nanotubes, or mixtures thereof may also be incorporated into the rubber composition along with the carbon black and/or silica or in place of the same.

The graphene can include any type of graphene, including monolayer or multilayer graphene, or turbostratic or graphene made from the Hummers method. The graphene can be produced from mechanical, chemical, and/or thermal processes. The lateral dimension of the graphene can be from <1 μm to approximately 15 μm. The chemical character can range from about 60% carbon to above 99% carbon, depending on the surface chemistry/functionalization that is present.

The functionalized graphene can include graphene with oxygen functionality on the surface ranging from hydroxyls, carboxylic acids, epoxides, and/or carbonyls. The functionalized graphene can also include graphene with nitrogen functionality in the form of amines, pyrrolic nitrogen, pyridinic nitrogen, pyrazoles, and/or pyrazolones. The functionality can range from <1% to greater than 30%. In one example, the functionalized graphene includes reduced graphene oxide (rGO) via reduction of graphene oxide into rGO.

The amount of the graphene and/or functionalized graphene in the rubber composition can be from 1 to 200 phr. In another example, the amount can be from about 1 phr to 100 phr or from about 1 phr to about 40 parts phr. In another example, the amount can be from about 1 phr to about 20 phr.

The carbon nanotubes can include any kind of carbon nanotubes including single-walled carbon nanotubes, multi-walled carbon nanotubes, and/or functionalized single- or multi-walled carbon nanotubes. The carbon nanotubes can be functionalized, in one example, with oxygen groups such as hydroxyls and/or carboxylic acids in the range of <1% to 10%. In one example, the carbon nanotubes can include a length of from about 0.5 μm to about 1.5 μm and a diameter from about 1 nm to about 30 nm. The amount of the carbon nanotubes in the rubber composition can be from about 1 to about 200 phr. In another example, the amount can be from about 1 phr to 100 phr or from about 1 phr to about 40 parts phr. In another example, the amount can be from about 1 phr to about 20 phr.

In one example, the total amount of reinforcing filler can be from about 2 to 300 phr. In another example, the total amount can be from 2 to 200 phr. In another example, the total amount can be from 10 phr to 130 phr or from about 10 phr to about 60 parts phr. In another example, the total amount can be from about 20 phr to about 50 phr.

(C) Pyrazolone-Based Compound

The pyrazolone-based compound is represented by the following Formula (1), or a salt thereof:

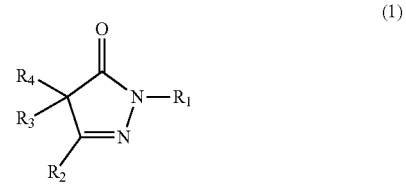

(1)

where $R_1$, $R_2$, $R_3$, and $R_4$ are the same or different, and each represents a hydrogen atom, an alkyl group, an aralkyl group, an aryl group, or a heterocyclic group; $R_3$ and $R_4$ may be taken together to form an alkylidene group, and $R_2$, $R_3$, and $R_4$ may be taken together to form an alkylene group; and each of these groups may have one or more substituents.

The "alkyl" as used can include linear, branched, or cyclic alkyl groups. Specific examples include C1-4 linear or branched alkyl groups, such as methyl, ethyl, n-propyl, isopropyl, n-butyl, isobutyl, s-butyl, t-butyl, and 1-ethylpropyl; C1-18 linear or branched alkyl groups, such as n-pentyl, isopentyl, neopentyl, n-hexyl, isohexyl, 3-methylpentyl, n-heptyl, n-octyl, n-nonyl, n-decyl, n-undecyl, n-dodecyl, 5-propylnonyl, n-tridecyl, n-tetradecyl, n-pentadecyl, hexadecyl, heptadecyl, and octadecyl; C3-8 cyclic alkyl groups, such as cyclopropyl, cyclobutyl, cyclopentyl, cyclohexyl, cycloheptyl, and cyclooctyl; and the like.

The "aralkyl" as used can include benzyl, phenethyl, trityl, 1-naphthylmethyl, 2-(1-naphthyl)ethyl, 2-(2-naphthyl)ethyl, and the like.

The "aryl" as used can include phenyl, biphenyl, naphthyl, dihydroindenyl, 9H-fluorenyl, and the like.

The "heterocyclic group" as used can include 2-pyridyl, 3-pyridyl, 4-pyridyl, 2-pyrazinyl, 2-pyrimidyl, 4-pyrimidyl, 5-pyrimidyl, 3-pyridazyl, 4-pyridazyl, 4-(1,2,3-triazyl), 5-(1,2,3-triazyl), 2-(1,3,5-triazyl), 3-(1,2,4-triazyl), 5-(1,2,4-triazyl), 6-(1,2,4-triazyl), 2-quinolyl, 3-quinolyl, 4-quinolyl, 5-quinolyl, 6-quinolyl, 7-quinolyl, 8-quinolyl, 1-isoquinolyl, 3-isoquinolyl, 4-isoquinolyl, 5-isoquinolyl, 6-isoquinolyl, 7-isoquinolyl, 8-isoquinolyl, 2-quinoxalyl, 3-quinoxalyl, 5-quinoxalyl, 6-quinoxalyl, 7-quinoxalyl, 8-quinoxalyl, 3-cinnolyl, 4-cinnolyl, 5-cinnolyl, 6-cinnolyl, 7-cinnolyl, 8-cinnolyl, 2-quinazolyl, 4-quinazolyl, 5-quinazolyl, 6-quinazolyl, 7-quinazolyl, 8-quinazolyl, 1-phthalazyl, 4-phthalazyl, 5-phthalazyl, 6-phthalazyl, 7-phthalazyl, 8-phthalazyl, 1-tetrahydroquinolyl, 2-tetrahydroquinolyl, 3-tetrahydroquinolyl, 4-tetrahydroquinolyl, 5-tetrahydroquinolyl, 6-tetrahydroquinolyl, 7-tetrahydroquinolyl, 8-tetrahydroquinolyl, 1-pyrrolyl, 2-pyrrolyl, 3-pyrrolyl, 2-furyl, 3-furyl, 2-thienyl, 3-thienyl, 1-imidazolyl, 2-imidazolyl, 4-imidazolyl, 5-imidazolyl, 1-pyrazolyl, 3-pyrazolyl, 4-pyrazolyl, 5-pyrazolyl, 2-oxazolyl, 4-oxazolyl, 5-oxazolyl, 2-thiazolyl, 4-thiazolyl, 5-thiazolyl, 3-isoxazolyl, 4-isoxazolyl, 5-isoxazolyl, 3-isothiazolyl, 4-isothiazolyl, 5-isothiazolyl, 4-(1,2,3-thiadiazolyl), 5-(1,2,3-thiadiazolyl), 3-(1,2,5-thiadiazolyl), 2-(1,3,4-thiadiazolyl), 4-(1,2,3-oxadiazolyl), 5-(1,2,3-oxadiazolyl), 3-(1,2,4-oxadiazolyl), 5-(1,2,4-oxadiazolyl), 3-(1,2,5-oxadiazolyl), 2-(1,3,4-oxadiazolyl), 1-(1,2,3-triazolyl), 4-(1,2,3-triazolyl), 5-(1,2,3-triazolyl), 1-(1,2,4-triazolyl), 3-(1,2,4-triazolyl), 5-(1,2,4-triazolyl), 1-tetrazolyl, 5-tetrazolyl, 1-indolyl, 2-indolyl, 3-indolyl, 4-indolyl, 5-indolyl, 6-indolyl, 7-indolyl, 1-isoindolyl, 2-isoindolyl, 3-isoindolyl, 4-isoindolyl, 5-isoindolyl, 6-isoindolyl, 7-isoindolyl, 1-benzimidazolyl, 2-benzimidazolyl, 4-benzimidazolyl, 5-benzimidazolyl, 6-benzimidazolyl, 7-benzimidazolyl, 2-benzofuranyl, 3-benzofuranyl, 4-benzofuranyl, 5-benzofuranyl, 6-benzofuranyl, 7-benzofuranyl, 1-isobenzofuranyl, 3-isobenzofuranyl, 4-isobenzofuranyl, 5-isobenzofuranyl, 6-isobenzofuranyl, 7-isobenzofuranyl, 2-benzothienyl, 3-benzothienyl, 4-benzothienyl, 5-benzothienyl, 6-benzothienyl, 7-benzothienyl, 2-benzoxazolyl, 4-benzoxazolyl, 5-benzoxazolyl, 6-benzoxazolyl, 7-benzoxazolyl, 2-benzothiazolyl, 4-benzothiazolyl, 5-benzothiazolyl, 6-benzothiazolyl, 7-benzothiazolyl, 1-indazolyl, 3-indazolyl, 4-indazolyl, 5-indazolyl, 6-indazolyl, 7-indazolyl, 2-morpholyl, 3-morpholyl, 4-morpholyl, 1-piperazyl, 2-piperazyl, 1-piperidyl, 2-piperidyl, 3-piperidyl, 4-piperidyl, 2-tetrahydropyranyl, 3-tetrahydropyranyl, 4-tetrahydropyranyl, 2-tetrahydrothiopyranyl, 3-tetrahydrothiopyranyl, 4-tetrahydrothiopyranyl, 1-pyrrolidyl, 2-pyrrolidyl, 3-pyrrolidyl, furanyl, 2-tetrahydrofuranyl, 3-tetrahydrofuranyl, 2-tetrahydrothienyl, 3-tetrahydrothienyl, 5-methyl-3-oxo-2,3-dihydro-1H-pyrazol-4-yl, and the like.

The "alkylidene group" as used can include methylidene, ethylidene, propylidene, isopropylidene, butylidene, and the like.

The "alkylene" as used can include ethylene, trimethylene, tetramethylene, pentamethylene, hexamethylene, heptamethylene, and the like. These alkylene groups may contain nitrogen, oxygen, or sulfur, or may be via phenylene. Such alkylene groups include —CH2NHCH2—, —CH2NHCH2CH2—, —CH2NHNHCH2—, —CH2CH2NHCH2CH2—, —CH2NHNHCH2CH2—, —CH2NHCH2NHCH2—, —CH2CH2CH2NHCH2CH2CH2—, —CH2OCH2CH2—, —CH2CH2OCH2CH2—, —CH2SCH2CH2—, —CH2CH2SCH2CH2—,

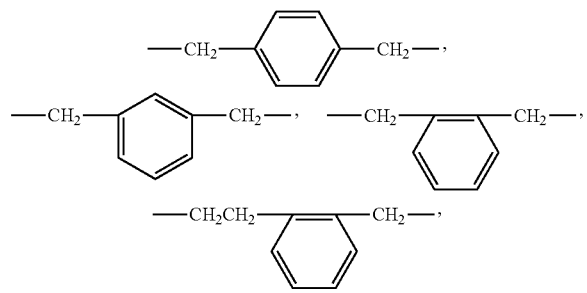

and the like.

The alkyl, aralkyl, aryl, heterocyclic, alkylidene, and alkylene groups may each have one or more substituents at a replaceable position. The "substituent" is not particularly limited. Examples of substituents include halogen atoms, amino, aminoalkyl, alkoxycarbonyl, acyl, acyloxy, amide, carboxyl, carboxyalkyl, formyl, nitrile, nitro, alkyl, hydroxyalkyl, hydroxy, alkoxy, aryl, aryloxy, heterocyclic, thiol, alkylthio, arylthio, and like groups.

In one example, the pyrazolone-based compound includes a compound in which $R_1$, $R_3$, and $R_4$ are the same or different, and each represents a hydrogen atom, a C1-4 linear or branched alkyl group, an aralkyl group, an aryl group, or a heterocyclic group. In another example, $R_1$ represents a hydrogen atom, $R_2$ represents a hydrogen atom or a C1-4 linear alkyl group, and $R_3$ and $R_4$ are both hydrogen atoms. In another example, the pyrazolone-based compound can include 5-pyrazolone, 3-methyl-5-pyrazolone, 3-(naphthalene-2-yl)-1H-pyrazol-5(4H)-one, 3-(furan-2-yl)-1H-pyrazol-5(4H)-one, 3-phenyl-1H-pyrazol-5(4H)-one, or 3-propyl-1H-pyrazol-5(4H)-one. In one example, the pyrazolone-based compound is a derivative of 5-pyrazolone, such as 3-methyl-5-pyrazolone, where $R_1$ represents a hydrogen atom, $R_2$ represents a methyl group, and $R_3$ and $R_4$ are both hydrogen atoms.

The amount of the pyrazolone-based compound in the rubber composition can be from about 0.1 to about 10 phr. In another example, the amount can include from 0.1 to 5 phr or from 0.1 to 2 parts phr. In yet another example, the amount can include from 0.6 to 1 phr.

(D) Processing Aid

The processing aid can be a compound represented by the following Formula (2):

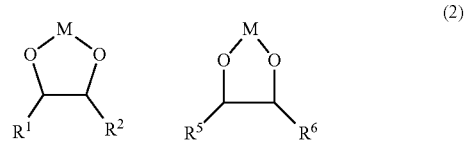

(2)

where M represents a divalent metal, and $R^5$ and $R^6$ can be the same or different and are selected from the group consisting of hydrogen atoms, alkyl groups, alkylene groups, hydroxyl substituted alkyl or alkylene groups, amine substituted alkyl or alkylene groups and thiol substituted alkyl or alkylene groups. Alkyl groups and alkylene groups can be the same as discussed above with respect to formula (1) for the pyrazolone-based compound.

In one example, M can be selected from the group consisting of zinc, calcium, and magnesium, and $R^5$ can represent a hydrogen atom and $R^6$ can represent an alkyl group containing from 1 to 20 carbon atoms. In another example, $R^5$ can represent a hydrogen atom and $R^6$ can represent an alkyl group containing from 6 to 18 carbon atoms. In another example, $R^5$ and $R^2$ can be the same or different and are selected from the group consisting of hydrogen atoms, alkyl groups, alkylene groups, hydroxyl substituted alkyl or alkylene groups, amine substituted alkyl or alkylene groups and thiol substituted alkyl or alkylene groups. In one example, the processing aid can be a metal glycerolate, such as zinc glycerolate, calcium glycerolate, or magnesium glycerolate. In another example, the processing aid is zinc glycerolate, which is of the structural formula:

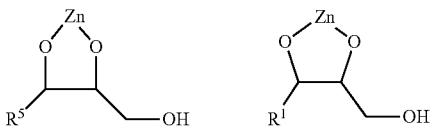

where $R^5$ represents hydrogen.

The amount of the processing aid in the rubber composition can be from about 1 phr to about 20 phr. In another example, the amount can include from 1 phr to 10 phr, or from 1 phr to 5 parts phr.

The pyrazolone-based compound, processing aid, and filler can be mixed into a desired rubber formulation utilizing any conventional procedure which results in thorough mixing to attain any essentially homogeneous formulation. For instance, the ingredients can be blended into the rubber formulation with a banbury mixer, a mill mixer, an extruder, a continuous mixer or the like. In some embodiments of this invention, the ingredients can be introduced into the rubbery polymer as a masterbatch. For instance, the pyrazolone-based compound, processing aid, and/or filler can be pre-blended into any desired rubbery polymer.

Other Ingredients

Various other processing additives, fillers, and other materials may be incorporated into the rubber composition of the tire tread 12 (or other desired tire layer) such as in conventional amounts. Oils, if used, may include processing oils known to people having ordinary skill in the art such as, for example, aromatic, paraffinic, naphthenic, vegetable oils, and low PCA oils such as, for example, MES, TDAE, SRAE, and heavy naphthenic oils. Typical amounts of oil, if used, are from about 0.1 to about 70 phr. Resins, if used, may include those resins used by those having skill in the art. In one example, the resin can include the reaction product of a methylene donor, such as hexamethylenetetramine and hexamethoxymethylamine, and a methylene acceptor, such as resorcinol and the like, including modified versions thereof. Typical amounts of resins, if used, are from about 0.5 to about 10 phr. Fatty acids, if used, may include those fatty acids used by those having skill in the art such as, for example, stearic acid and the like. Typical amounts of fatty acids, if used, can be from about 0.5 to about 15 phr. Typical amounts of zinc oxide, if used, are from about 1 to about 10 phr. Waxes, such as microcrystalline waxes or paraffinic waxes, may be used. Typical amounts of microcrystalline waxes, if used, are from about 1 to about 5 phr. Antioxidants, if used, may include those antioxidants used by those having skill in the art such as, for example, polymerized trimethyl dihydroquinoline and others such as, for example, those disclosed in The Vanderbilt Rubber Handbook (1978), pages 344 through 346. Typical amounts of antioxidants, if used, are from about 0.1 to about 10 phr. Antiozonants, if used, may include those antiozonants used by those having skill in the art such as, for example, p-phenylenediamine compounds, including 6PPD and the like. Typical amounts of antiozonants, if used, are from about 1 to about 10 phr. Peptizing agents, if used, may include those peptizing agents conventionally used by those having skill in the art such as, for example, pentachlorothiophenol and dibenzamidodiphenyl disulfide. Typical amounts of peptizing agents, if used, are from about 0.1 phr to about 10 phr. In one example, there are no phenolic resins.

Coupling agents, if used, may include those known to people having ordinary skill in the art such as, for example, a silane coupling agent, a titanate coupling agent, an aluminate coupling agent, or a zirconate coupling agent. Typical amounts of coupling agents, if used, are from about 0.1 to about 20 phr or from about 3 to 15 phr.

Other inorganic fillers can be utilized here including, for example, aluminas ($Al_2O_3$) such as y-alumina and a-alumina; alumina monohydrates ($Al_2O_3 \cdot H_2O$) such as boehmite and diaspore; aluminum hydroxides [$Al(OH)_3$] such as gibbsite and bayerite; aluminum carbonate [$Al_2(CO_3)_3$], magnesium hydroxide [$Mg(OH)_2$], magnesium oxide (MgO), magnesium carbonate ($MgCO_3$), talc ($3MgO \cdot 4SiO_2 \cdot H_2O$), attapulgite ($5MgO \cdot 8SiO_2 \cdot 9H_2O$), titanium white ($TiO_2$), titanium black ($TiO_2n-1$), calcium oxide (CaO), calcium hydroxide [$Ca(OH)_2$], magnesium aluminum oxide ($MgO \cdot Al_2O_3$), clay ($Al_2O_3 \cdot 2SiO_2$), kaolin ($Al_2O_3 \cdot 2SiO_2 \cdot 2H_2O$), pyrophyllite ($Al_2O_3 \cdot 4SiO_2 \cdot H_2O$), bentonite ($Al_2O_3 \cdot 4SiO_2 \cdot 2H_2O$), aluminum silicates ($Al_2SiO_5$, $Al_4 \cdot 3SiO_4 \cdot 5H_2O$, etc.), magnesium silicates ($Mg_2SiO_4$, $MgSiO_3$, etc.), calcium silicates ($Ca_2 \cdot SiO_4$ etc.), aluminum calcium silicates ($Al_2O_3 \cdot CaO \cdot 2SiO_2$ etc.), magnesium calcium silicate ($CaMgSiO_4$), calcium carbonate ($CaCO_3$), zirconium oxide ($ZrO_2$), zirconium hydroxide [$ZrO(OH)_2 \cdot nH_2O$], zirconium carbonate [$Zr(CO_3)_2$], zinc acrylate, zinc methacrylate, and crystalline aluminosilicates containing hydrogen, alkali metal, or alkaline earth metal that compensate charge, such as various types of zeolites. Typical amounts of inorganic fillers, if used, are from about 2 phr to about 200 phr.

The rubber composition for the tire tread 12 as well as the various tire components—including the shoulder regions 14, sidewalls 16, the rubber matrix portion of the carcass 18, such as the radial ply 20, and the at least one belt ply 23—may be compounded by methods generally known in the rubber compounding art. One such method is mixing the various sulfur-vulcanizable constituent rubbers with the above noted materials/chemical compounds and processing additives such as, for example, any fillers, pigments, fatty acids, zinc oxide, waxes, antioxidants, antiozonants, peptizing agents, coupling agents, and reinforcing materials and other various commonly used additive materials such as, for example, sulfur donors, curing aids, and the like. As known to those skilled in the art, depending on the intended use of the sulfur vulcanizable and sulfur vulcanizable material (rubbers), the additives mentioned above can be selected and commonly used in conventional amounts.

By way of example, vulcanization can be conducted in the presence of a sulfur donor or vulcanizing agent. Examples of suitable sulfur vulcanizing agents may include, for example, elemental sulfur (free sulfur), insoluble sulfur, or sulfur donating vulcanizing agents such as, for example, an amine disulfide, polymeric polysulfide, or sulfur olefin adducts. In one embodiment, the sulfur vulcanizing agent is elemental sulfur. The amount of elemental sulfur used can be from about 0.5 to about 5 phr and insoluble sulfur from about 0.5 to about 10 phr.

Curing agents may be used to further control the vulcanization process. Vulcanization accelerators also may be used such as to help control the time and/or temperature required for vulcanization and to improve properties of the vulcanizate. Commonly used types of accelerators that may be used are amines, disulfides, guanidines, thioureas, thiazoles, thiurams, sulfonamides, and xanthates and in conventional amounts. In one example, the accelerator can include N-cyclohexyl-2-benzothiazole sulfenamide and/or 1,3-diphenylguanidine. Typical amounts of accelerators, if used, are from about 1 to about 5 phr. Vulcanization retarders also might also be used. If used, vulcanization retarders may include compounds such as, for example, N-(cyclohexylthio) Phthalimide and the like in conventional amounts.

The mixing of the rubber composition can be accomplished by a sequential mixing process that can include at least one non-productive mixing step followed by a productive mixing step. For example, the ingredients/components may be mixed in two or more (sometimes at least three) mixing stages, namely, at least one non-productive (preparatory) stage followed by a productive (final) mix stage. The final curatives are typically mixed in the final stage, which is conventionally called the "productive" or "final" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art.

The rubber compound may be subjected to a thermomechanical mixing step. The thermomechanical mixing step generally includes a mechanical working in a mixer or extruder for a period of time suitable in order to produce a rubber temperature between about 140° C. and about 190° C. for the non-productive mixing step(s) and about 110° C. or less for the productive mixing step. The appropriate duration of the thermomechanical working varies as a function of the operating conditions, and the volume and nature of the components. For example, the thermomechanical working may be from about 1 to about 20 minutes.

It is conventionally required after each mixing step that the rubber mixture is actually removed from the rubber mixer and cooled to a temperature of less than 40° C. It is conventionally required that the rubber compound is subsequently added back to an internal rubber mixer for the next rubber mixing step, or stage. It is also considered that other conventionally known methods for achieving mixtures of the different compounds such as, for example, a masterbatch, may be implemented instead of or in addition to the conventional dry mixing steps set out above.

Vulcanization of the tire 10 can generally be carried out at conventional temperatures from about 100° C. to about 200° C. In one embodiment, the vulcanization can be conducted at temperatures from about 110° C. to about 180° C. Any of the usual vulcanization processes may be used such as heating in a press or mold, heating with superheated steam or hot air. Such tires can be built, shaped, molded and cured by various methods, which are known and will be readily apparent to those having skill in such art.

The resulting tire 10 of the present invention with its tire tread 12 having a pyrazolone-based compound may be a race tire, passenger tire, aircraft tire, agricultural, earthmover, off-the-road, truck tire, and the like. In one embodiment, the tire 10 is a motor vehicle or aircraft tire. The tire 10 may also be a radial or bias tire.

EXAMPLES

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments.

With reference to the examples/samples and Tables below, unless otherwise noted below, the non-productive batches were mixed for 3 to 6 minutes to a drop temperature between 150-170° C. with the productive mix being mixed for 2 to 5 minutes to a drop temperature of 95-115° C. to produce the rubber compounds.

Concerning testing/test results, unless otherwise noted below, the uncured G'/RPA data was measured using ASTM D6601 on a Rubber Process Analyzer RPA2000™ by Alpha Technologies. The tensile, modulus, and elongation data was measured using ASTM D412-98a. The Zwick rebound data was measured using ASTM D1415. The Instron Tear data, which obtains a measure of interfacial tear on stocks that have been cured with backing materials, is measured using a sample cured in a 76×153×12.7 mm mold for a specified time and temperature.

TABLE 1A full carbon black formulation

| Ingredient | Sample A | Sample B | Sample C | Sample D | Sample E | Sample F | Sample G | Sample H |
|---|---|---|---|---|---|---|---|---|
| | Non-Productive Stage | | | | | | | |
| Natural Rubber | 100 | 100 | 100 | 100 | 100 | 100 | 100 | 100 |
| Carbon Black[1] | 50 | 50 | 50 | 50 | 50 | 50 | 50 | 50 |
| Antidegradent Package | 3 | 3 | 3 | 3 | 3 | 3 | 3 | 3 |
| Fatty Acid | 3 | 3 | 3 | 3 | 3 | 3 | 3 | 3 |
| Pyrazalone-based compound[2] | | 1 | 1.2 | 2 | | 1 | 1.2 | 2 |
| ZnO | 3 | 3 | 3 | 3 | 3 | 3 | 3 | 3 |
| Processing Aid[3] | | | | | 4 | 4 | 4 | 4 |
| | Productive Stage | | | | | | | |
| Curing Agent A | 1.5 | 1.5 | 1.5 | 1.5 | 1.5 | 1.5 | 1.5 | 1.5 |
| Accelerator A[4] | 1 | 1 | 1 | 1 | 1 | 1 | 1 | 1 |
| Accelerator B[4] | 0.5 | 0.5 | 0.5 | 0.5 | 0.5 | 0.5 | 0.5 | 0.5 |

[1]ASTM N121
[2]3-methyl-5-pyrazolone
[3]zinc glycerolate
[4]sulfenamide and guanidine types With reference to Table 1A, Sample A is a control with full carbon black and is completely devoid of any 3-methyl-5-pyrazolone and zinc glycerolate. Samples B-H were prepared using the same processing parameters to those of Sample A. In comparison to Sample A, each of Sample's B, C, and D further included various amounts of 3-methyl-5-pyrazolone (1, 1.2, and 2 phr, respectively), Sample E further included 4 phr of zinc glycerolate, and Samples F, G, and H further included various amounts of 3-methyl-5-pyrazolone (1, 1.2, and 2 phr, respectively) and 4 phr of zinc glycerolate.

TABLE 1B

| | Compound Description | Sample A | Sample B | Sample C | Sample D | Sample E | Sample F | Sample G | Sample H |
|---|---|---|---|---|---|---|---|---|---|
| Processing | Uncured G', RPA | 0.20 | 0.30 | 0.31 | 0.33 | 0.20 | 0.25 | 0.26 | 0.28 |
| Cure | Delta Torque, MDR 150° C. | 17.2 | 16.1 | 15.4 | 12.7 | 16.9 | 15.9 | 15.5 | 14.4 |
| | T25, MDR 150° C. | 2.6 | 2.9 | 3.1 | 2.6 | 3.6 | 4.0 | 4.1 | 3.5 |
| | T90, MDR 150° C. | 6.2 | 7.7 | 8.5 | 8.7 | 7.8 | 10.0 | 10.6 | 10.6 |
| Stiffness, | G' 1%, RPA | 2.30 | 2.83 | 2.67 | 2.90 | 2.30 | 2.67 | 2.60 | 2.79 |
| Hardness | G' 10%, RPA | 1.53 | 1.73 | 1.66 | 1.63 | 1.55 | 1.66 | 1.63 | 1.67 |
| | G' 50%, RPA | 1.12 | 1.17 | 1.12 | 1.01 | 1.15 | 1.16 | 1.14 | 1.09 |
| | 100% Modulus | 2.9 | 2.7 | 2.5 | 2.0 | 3.1 | 3.0 | 3.0 | 2.7 |
| | 300% Modulus | 16.5 | 14.3 | 13.1 | 10.3 | 17.1 | 14.7 | 14.1 | 12.7 |
| | Shore A Hardness 23° C. | 64 | 67 | 65 | 64 | 68 | 72 | 71 | 69 |
| | G' 1%, ARES (MPa) | 3.54 | 4.19 | 3.43 | 3.19 | 3.52 | 5.16 | 5.16 | 4.98 |
| | G' 10%, ARES (MPa) | 2.02 | 2.20 | 1.96 | 1.76 | 1.98 | 2.49 | 2.47 | 2.37 |
| Hysteresis | TD 10%, RPA | 0.108 | 0.128 | 0.125 | 0.151 | 0.106 | 0.128 | 0.125 | 0.133 |
| | TD 10%, ARES | 0.142 | 0.136 | 0.12 | 0.141 | 0.144 | 0.147 | 0.144 | 0.136 |
| | Rebound 0° C. | 33 | 33 | 33 | 34 | 32 | 34 | 34 | 34 |
| | Rebound 23° C. | 49 | 49 | 48 | 50 | 47 | 49 | 49 | 49 |
| | Rebound 100° C. | 66 | 64 | 63 | 61 | 64 | 64 | 64 | 63 |
| Tear | Tensile | 26 | 25 | 24 | 21 | 24 | 24 | 25 | 24 |
| | Elongation | 481 | 530 | 526 | 539 | 436 | 505 | 536 | 558 |
| | Instron (N/mm) | 53 | 100 | 107 | 94 | 47 | 81 | 91 | 129 |
| | Strebler to Self, 100° C. (N/mm) | 26 | 49 | 61 | 54 | 20 | 45 | 49 | 66 |

With reference to Table 1B, the addition of the pyrazalone-based compound at different loadings shows an enhanced bulk (Instron) and adhesive (Strebler) tear strength (Sample B-D), specifically, when looking at Instron and Strebler. In some cases, the tear strength improvement was doubled compared to the control (Sample A). A desirable level of the pyrazalone-based compound was found to be Sample C, however, the addition of the pyrazalone-based compound led to negatively impacting uncured viscosity (G'0.83 Hz), and cured stiffness (ARES G'1% and G'10%, (Samples C and D). To address deficiency, addition of a processing aid (Sample G) was implemented, which mitigated the reduction of the negatively impacted uncured viscosity (G'0.83 Hz,) while increasing cured stiffness (ARES G'1% and G'10%), and maintaining hysteresis (ARES tangentTan delta 10%) compared to the control Sample A.

TABLE 2A

Half carbon black/half silica formulation

| | Samples | | | | | | | |
|---|---|---|---|---|---|---|---|---|
| | Sample A | Sample B | Sample C | Sample D | Sample E | Sample F | Sample G | Sample H |
| Natural Rubber | 100 | 100 | 100 | 100 | 100 | 100 | 100 | 100 |
| Carbon Black[1] | 20 | 20 | 20 | 20 | 20 | 20 | 20 | 20 |
| Pyrazolone-based compound[2] | | 1 | 1.2 | 2 | | 1 | 1.2 | 2 |
| Silica[3] | 20 | 20 | 20 | 20 | 20 | 20 | 20 | 20 |
| Processing Aid[4] | | | | | 4 | 4 | 4 | 4 |

[1]ASTM N550
[2]3-methyl-5-pyrazolone
[3]Synthetic, amorphous, and precipitated conventional silica with BET of 130 m2/g
[4]zinc glycerolate With reference to Table 2A, Sample A is a control with half carbon black and half silica and is completely devoid of any 3-methyl-5-pyrazolone and zinc glycerolate. Samples B-H were prepared using the same processing parameters to those of Sample A. In comparison to Sample A, each of Samples B, C, and D further included various amounts of 3-methyl pyrazolone (1, 1.2, and 2 phr, respectively), Sample E further included 4 phr of zinc glycerolate, and Samples F, G, and H further included various amounts of 3-methyl-5-pyrazolone (1, 1.2, and 2 phr, respectively) and 4 phr of zinc glycerolate.

TABLE 2B

| | | Sample A | Sample B | Sample C | Sample D | Sample E | Sample F | Sample G | Sample H |
|---|---|---|---|---|---|---|---|---|---|
| Processing | Uncured G', RPA | 0.187 | 0.191 | 0.197 | 0.212 | 0.17 | 0.167 | 0.165 | 0.171 |
| Cure | Delta Torque, MDR 150° C. | 14.6 | 12.8 | 12.9 | 11.6 | 14.8 | 13.7 | 12.9 | 12.9 |
| | T25, MDR 150° C. | 18.2 | 19.2 | 17.8 | 14.6 | 18.0 | 18.6 | 17.7 | 13.7 |
| | T90, MDR 150° C. | 39.5 | 57.6 | 56.4 | 51.2 | 46.7 | 63.5 | 61.7 | 51.8 |
| Stiffness | G' 1%, RPA | 1.47 | 1.49 | 1.53 | 1.58 | 1.47 | 1.53 | 1.57 | 1.77 |
| | G' 10%, RPA | 1.23 | 1.21 | 1.21 | 1.20 | 1.15 | 1.22 | 1.21 | 1.29 |
| | G' 100%, RPA | 0.690 | 0.688 | 0.691 | 0.631 | 0.677 | 0.690 | 0.683 | 0.650 |
| | 100% Modulus, DieC | 2.6 | 2.6 | 2.4 | 2.4 | 3.0 | 2.8 | 2.8 | 2.6 |
| | 300% Modulus, DieC | 12.1 | 9.7 | 9.2 | 9.2 | 13.0 | 10.0 | 9.9 | 9.1 |
| Hysteresis | ARES G'10% (MPa) | 1.30 | 1.17 | 1.22 | 1.31 | 1.28 | 1.17 | 1.45 | 1.52 |
| | TD 10%, RPA | 0.043 | 0.049 | 0.054 | 0.063 | 0.069 | 0.059 | 0.069 | 0.078 |
| | TD 10%, ARES | 0.031 | 0.044 | 0.048 | 0.06 | 0.051 | 0.063 | 0.06 | 0.078 |
| | Rebound 23° C. | 67 | 63 | 63 | 60 | 65 | 58 | 60 | 61 |
| | Rebound 100° C. | 84 | 81 | 80 | 77 | 84 | 77 | 78 | 75 |
| | MTS Temp Change | 10.6 | 10.7 | 10.6 | 12.0 | 10.3 | 12.5 | 12.6 | 13.8 |
| Tear, Chip/ | Tensile | 23 | 29 | 26 | 30 | 21 | 25 | 25 | 28 |
| Chunk, Cut | Elongation | 467 | 607 | 571 | 649 | 419 | 537 | 550 | 614 |
| Penetration | Demattia mm/min | 0.142 | 0.069 | 0.058 | 0.020 | 0.381 | 0.079 | 0.067 | 0.040 |
| | Instron (N/mm) | 6 | 75 | 85 | 89 | 8 | 36 | 48 | 73 |
| | Strebler to Self, 100° C. (N) | 27 | 106 | 165 | 132 | 37 | 68 | 93 | 193 |

With reference to Table 2B, the addition of the pyrazalone-based compound at different loadings shows an enhanced bulk (tear strength (Sample B-D), specifically, when looking at Instron and adhesive (Strebler) tear strength and crack growth mitigation (DeMattia) (Sample B-D). In some cases, the improvement of tear strength was by an order of magnitude compared to the control (Sample A). This improvement was also seen in mitigation of crack growth over time in reduction of mm/min when using the pyralozone-based compound in Sample B-D as compared to the control (Sample A). A desirable level of the pyrazalone-based compound was found to be Sample C, however, the addition of the pyrazalone-based compound led to negatively impacting uncured viscosity (G'0.83 Hz) and cured stiffness (ARES G'10%). To address this deficiency, addition of a processing aid (Sample G) was implemented, which mitigated in reduction of the negatively impacted uncured viscosity (G'0.83 Hz Sample G compared to Sample A), while increasing cured stiffness (ARES G'10, Sample G compared to the control Sample A).

TABLE 3A

| | | Graphene formulation 1 | | | | |
|---|---|---|---|---|---|---|
| Ingredients | Stage | Sample A | Sample B | Sample C | Sample D | Sample E |
| Natural Rubber | NP1 | 100 | 100 | 100 | 100 | 100 |
| Carbon Black[1] | NP1 | 20 | 30 | 30 | 20 | 20 |
| Microcrystalline Wax | NP1 | 1 | 1 | 1 | 1 | 1 |
| TMQ - Trimethyl Dihydroquinoline | NP1 | 1 | 1 | 1 | 1 | 1 |
| 6PPD | NP1 | 1 | 1 | 1 | 1 | 1 |
| Fatty acid | NP1 | 3 | 3 | 3 | 3 | 3 |
| Pyrazolone-based compound[2] | NP1 | | | | | 1 |
| Graphene[3] | NP1 | | | | 1.5 | 1.5 |
| | NP2 | 126 | 136 | 136 | 127.5 | 128.5 |
| Carbon Black[1] | NP2 | 10 | 10 | 20 | 10 | 10 |
| | NP3 | 136 | 146 | 156 | 137.5 | 138.5 |
| Zinc Oxide | NP3 | 3 | 3 | 3 | 3 | 3 |
| | PR | 139 | 149 | 159 | 140.5 | 141.5 |
| Sulfur | PR | 1.5 | 1.5 | 1.5 | 1.5 | 1.5 |
| Accelerators[4] | PR | 1.5 | 1.5 | 1.5 | 1.5 | 1.5 |
| | | 142 | 152 | 162 | 143.5 | 144.5 |

[1]ASTM N121 carbon black

[2]3-methyl-5-pyrazolone

[3]Graphene as a dispersion of 7.4% by weight in natural rubber masterbatch (natural rubber content included in total natural rubber reported in Table 3A)

[4]Sulfenamide and guanidine types

With reference to Table 3A, Samples A, B, and C are controls with varying amounts of carbon black (30, 40, and 50 phr, respectively) and being completely devoid of any 3-methyl-5-pyrazolone and graphene. Samples D and E were prepared using the same processing parameters to those of Samples A-C. In comparison to Sample A, Sample D further included 1.5 phr graphene in the first non-productive mixing stage and Sample E further included 1.5 phr graphene and 1 phr of 3-methyl-5-pyrazolone in the first non-productive mixing stage.

TABLE 3B

| | | Sample | | | | |
|---|---|---|---|---|---|---|
| | | Sample A | Sample B | Sample C | Sample D | Sample E |
| Processing | Uncured G', RPA (MPa) | 0.12 | 0.14 | 0.19 | 0.13 | 0.16 |
| Cure | Delta Torque, MDR 150° C. | 12.1 | 14.5 | 17.7 | 13.9 | 12.3 |
| | T25, MDR 150° C. (min) | 3.1 | 2.7 | 2.5 | 3 | 3.7 |
| | T90, MDR 150° C. (min) | 6 | 5.8 | 5.9 | 6.1 | 8.3 |
| Stiffness, | G' 1%, RPA (MPa) | 1.02 | 1.45 | 2.28 | 1.27 | 1.13 |
| Hardness | G' 10%, RPA (MPa) | 0.89 | 1.14 | 1.48 | 1.04 | 0.96 |
| | G' 100%, RPA (MPa) | 0.75 | 0.9 | 1.07 | 0.86 | 0.8 |
| | 100% Modulus (MPa) | 1.8 | 2.5 | 3.1 | 2.6 | 2.6 |
| | 300% Modulus (MPa) | 10 | 13.5 | 16.2 | 13.5 | 12.3 |
| | Shore A Hardness 23° C. | 54 | 59 | 66 | 60 | 58 |
| | G' 1%, ARES (MPa) | 1.54 | 2.17 | 3.75 | 1.96 | 1.75 |
| | G' 10%, ARES (MPa) | 1.19 | 1.45 | 2.05 | 1.38 | 1.31 |
| Hysteresis | TD 10%, RPA | 0.053 | 0.081 | 0.119 | 0.064 | 0.059 |
| | TD 10%, ARES | 0.083 | 0.114 | 0.153 | 0.103 | 0.083 |
| | Rebound 23° C. | 67 | 59 | 48 | 61 | 66 |
| | Rebound 100° C. | 81 | 75 | 67 | 77 | 79 |
| Tear | Tensile (MPa) | 29 | 29 | 29 | 27 | 29 |
| | Elongation (%) | 552 | 529 | 504 | 502 | 575 |
| | Instron w/Backing (N/mm) | 39 | 44 | 50 | 24 | 46 |
| | Strebler to Self, 100° C. (N/mm) | 18 | 23 | 23 | 10 | 22 |

With reference to Table 3B, the tradeoff in tear properties with the addition of graphene to the compound formulation (Sample D) are clear via Instron tear and Strebler tear. As demonstrated with Sample D, the bulk tear (Instron) decreased by about 40% compared to Sample A, the adhesive tear (Strebler) decreased by about 45% compared to Sample A, the compound stiffness (G' 1%) increased, and the compound hysteresis (tangent delta, hot rebound) increased. In comparison, the addition of 3-methyl-5-pyrazolone with graphene (Sample E) balances the tradeoffs. The combination of graphene and 3-methyl-5-pyrazolone in Sample E resulted in an 18% increase in bulk tear, a 22% increase in adhesive tear, a 13% increase in low strain stiffness (G' 1%), and an approximately equivalent hysteresis (tangent delta, hot rebound) compared to Sample A.

TABLE 4A

| | Graphene formulation 2 | | | |
|---|---|---|---|---|
| | Sample A | Sample B | Sample C | Sample D |
| Natural Rubber | 100 | 100 | 100 | 100 |
| Carbon Black[1] | 20 | 22 | 22 | 20 |
| Pyrazalone-based compound[2] | | | 1.2 | 1.2 |
| Silica A[3] | 20 | 4 | 4 | 20 |
| Silica B[4] | | 4 | 4 | |
| Graphene[5] | | 3 | 3 | |

[1]ASTM N550 carbon black
[2]3-methyl-5-pyrazolone
[3]Synthetic, amorphous, and precipitated conventional silica with CTAB of 130 m$^2$/g
[4]Synthetic, amorphous, and precipitated highly dispersible silica with CTAB of 250 m$^2$/g
[5]Graphene as a dispersion of 7.4% by weight in natural rubber masterbatch (natural rubber content included in total natural rubber reported in Table 4A)

With reference to Table 4A, Sample A is a control with a blend of carbon black and silica and being completely devoid of any 3-methyl-5-pyrazolone and graphene. Sample D is similar to Sample A but contains 1.2 phr of 3-methyl-5-pyrazolone. Samples B and C vary in the loading of carbon black and silica as well as type of silica, as compared to Samples A and D. Sample B contains 3 phr of graphene but is devoid of any 3-methyl-5 pyrazolone while Sample C combines the graphene and 3-methyl-5-pyrazolone in the same formulation. All samples were prepared using the same processing parameters.

TABLE 4B

| | Sample | Sample A | Sample B | Sample C | Sample D |
|---|---|---|---|---|---|
| Processing | Uncured G', RPA (MPa) | 0.19 | 0.156 | 0.166 | 0.216 |
| Cure | Delta Torque, MDR 150° C. | 14.0 | 16.8 | 14.1 | 12.2 |
| | T25, MDR 150° C. (min) | 19.3 | 14.7 | 15.9 | 17.6 |
| | T90, MDR 150° C. (min) | 41.6 | 35.3 | 49.0 | 55.1 |

TABLE 4B-continued

| | Sample | Sample A | Sample B | Sample C | Sample D |
|---|---|---|---|---|---|
| Stiffness, Hardness | G' 1%, RPA (MPa) | 1.51 | 1.72 | 1.69 | 1.53 |
| | G' 10%, RPA (MPa) | 1.32 | 1.50 | 1.38 | 1.25 |
| | G' 100%, RPA (MPa) | 0.05 | 0.07 | 0.10 | 0.07 |
| | 100% Modulus (MPa) | 2.5 | 4.2 | 3.6 | 2.3 |
| | 300% Modulus (MPa) | 10.8 | 15.9 | 12.8 | 8.1 |
| Hysteresis | TD 10%, RPA | 0.045 | 0.044 | 0.061 | 0.057 |
| | Rebound 23° C. | 65 | 66 | 64 | 60 |
| | Rebound 100° C. | 82 | 82 | 78 | 74 |
| Tear, Crack Growth | Tensile (MPa) | 25 | 22 | 24 | 29 |
| | Elongation (%) | 537 | 420 | 528 | 678 |
| | DeMattia Hot Wedge Pierce (min/mm) | 7.0 | 6.0 | 11.3 | 18.7 |
| | Instron w/Backing (N/mm) | 12 | 3 | 14 | 31 |
| | Strebler to Self, 100° C. (N/mm) | 7 | 7 | 10 | 26 |
| Conductivity | Thermal Conductivity (W/mK) | 0.249 | 0.272 | 0.269 | 0.247 |

With reference to Table 4B, the benefits of 3-methyl-5-pyrazolone addition are observed in Sample D, with a 158% improvement in bulk tear (Instron) and a 271% improvement in adhesive tear. The addition of graphene and further modification of the compound formulation as represented by Sample B results in a compound with a reduction of 75% in bulk tear and equivalent adhesive tear. Sample B has higher stiffness (G' 1%, 10%, 50%), equivalent hysteresis (tangent delta, hot rebound), a 9% increase in thermal conductivity, but lower tensile strength and lower elongation at break. The combination of the graphene, formulation adjustments, and 3-methyl-5-pyrazolone in Sample C results in a 16% improvement in bulk tear strength, a 43% improvement in adhesive tear strength, and a 61% improvement in crack growth (DeMattia), compared to Sample A. Sample C showed a significant improvement in tensile strength and elongation at break compared to Sample B, bringing it in-line with Sample A. The Sample C formulation also resulted in an 8% increase in thermal conductivity compared to Sample A. While Sample C did also result in increased hysteresis (hot rebound) compared to Sample A, it also had higher stiffness. Sample C and the combination of graphene, 3-methyl-5-pyrazolone, and a high surface area silica result in a desirable balance of tradeoffs.

TABLE 5A

| Carbon nanotubes formulation | | | | | | |
|---|---|---|---|---|---|---|
| Ingredients | Stage | Sample A | Sample B | Sample C | Sample D | Sample E |
| Natural Rubber | NP1 | 100 | 100 | 100 | 100 | 100 |
| Carbon Black[1] | NP1 | 30 | 30 | 30 | 30 | 30 |
| Microcrystalline Wax | NP1 | 1 | 1 | 1 | 1 | 1 |
| TMQ - Trimethyl Dihydroquinoline | NP1 | 1 | 1 | 1 | 1 | 1 |
| 6PPD | NP1 | 1 | 1 | 1 | 1 | 1 |
| Fatty acid | NP1 | 3 | 3 | 3 | 3 | 3 |
| Pyrazolone-based compound[2] | NP1 | | 1 | | | 1 |
| Oil[3] | NP1 | | | 6.47 | 6.47 | 6.47 |
| Carbon nanotubes[4] | NP1 | | | | 2 | 2 |
| | NP2 | 126 | 136 | 136 | 127.5 | 128.5 |
| Carbon Black[1] | NP2 | 20 | 20 | 20 | 20 | 20 |
| | NP3 | 136 | 146 | 156 | 137.5 | 138.5 |
| Zinc Oxide | NP3 | 3 | 3 | 3 | 3 | 3 |
| | PR | 139 | 149 | 159 | 140.5 | 141.5 |
| Sulfur | PR | 1.5 | 1.5 | 1.5 | 1.5 | 1.5 |
| Accelerators[5] | PR | 1.5 | 1.5 | 1.5 | 1.5 | 1.5 |
| | | 142 | 152 | 162 | 143.5 | 144.5 |

[1] ASTM N121 carbon black

[2] 3-methyl-5-pyrazolone

[3] Naphthenic type

[4] MRO Gen II, low-oxidation surface functionalized multiwalled carbon nanotubes (MWCNT) as a dispersion of nominally 23.6% by weight in naphthenic oil (oil content included in the total oil reported in Table 5A)

[5] Sulfenamide and guanidine types

With reference to Table 5A, Sample A is a control with 50 phr of carbon black and being devoid of carbon nanotubes and 3-methyl-5pyrazolone. Sample B is an equivalent control to Sample A with the addition of 1 phr of 3-methyl-5-pyrazolone. Similarly, Sample C is a control equivalent to Sample A but also including 6.47 phr of oil. Sample D can be considered the same as Sample C but also containing 2 phr of carbon nanotubes. Sample E is the same formulation as Sample D but also includes 1 phr of 3-methyl-5-pyrazolone. All Samples were prepared using the same processing parameters. Sample E combines the use of carbon nanotubes and 3-methyl-5-pyrazolone, both added in the first non-productive stage of mixing.

TABLE 5B

| | | Sample | | | | |
|---|---|---|---|---|---|---|
| | | Sample A | Sample B | Sample C | Sample D | Sample E |
| Processing | Uncured G', RPA (MPa) | 0.186 | 0.253 | 0.171 | 0.195 | 0.253 |
| Cure | Delta Torque, MDR 150° C. | 16.2 | 15.3 | 14.3 | 16.2 | 14.3 |
| | T25, MDR 150° C. (min) | 3.0 | 3.7 | 3.3 | 3.2 | 4.0 |
| | T90, MDR 150° C. (min) | 6.9 | 9.0 | 7.1 | 7.2 | 9.9 |
| Stiffness, | 100% Modulus (MPa) | 3.4 | 2.9 | 3.1 | 3.5 | 3.1 |
| Hardness | 300% Modulus (MPa) | 18.2 | 14.6 | 16.4 | 17.1 | 13.9 |
| | Shore A Hardness 23° C. | 66 | 65 | 64 | 67 | 66 |
| | G' 1%, ARES (MPa) | 4.21 | 4.31 | 3.48 | 4.37 | 4.92 |
| | G' 10%, ARES (MPa) | 2.17 | 2.18 | 1.82 | 2.05 | 2.18 |
| | G' 50%, ARES (MPa) | 1.38 | 1.36 | 1.18 | 1.26 | 1.27 |
| Hysteresis | TD 10%, ARES | 0.172 | 0.147 | 0.169 | 0.194 | 0.176 |
| | Rebound 23° C. | 47 | 51 | 48 | 46 | 47 |
| | Rebound 100° C. | 65 | 65 | 65 | 63 | 61 |
| Tear | Tensile (MPa) | 28.7 | 27.7 | 27.6 | 27.3 | 26.2 |
| | Elongation (%) | 452 | 512 | 470 | 458 | 514 |
| | Instron w/Backing (N/mm) | 58 | 67 | 63 | 63 | 105 |
| | Strebler to Self, 100° C. (N/mm) | 27 | 44 | 29 | 29 | 54 |

With reference to Table 5B, the benefits of the combination of 3-methyl pyrazolone and carbon nanotubes are evidenced in Sample E where the bulk tear (Instron) improves by 81% and the adhesive tear (Strebler) improves by 100%, compared to Sample A, which is devoid of 3-methyl-5-pyrazolone and carbon nanotubes. These benefits in compound properties are not possible with either 3-methyl-5-pyrazolone or carbon nanotubes alone, as demonstrated in Samples B-D. Stiffness and hardness of Sample E is mostly in line with that of Sample A, with a slight increase at low strain, which then results in a minor increase in hysteresis, depending on the measurement (tangent delta, rebound, hot rebound).

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative product and method and illustrative examples shown and described. Accordingly, departures may be made from such details without departing from the scope of the general inventive concept.

What is claimed is:

1. A pneumatic tire comprising:
a tire layer, the tire layer including a rubber composition comprising:
100 parts of natural rubber;
a pyrazolone-based compound represented by the following Formula (1), or a salt thereof:

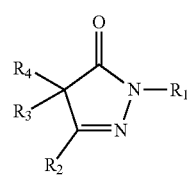

where $R_1$, $R_2$, $R_3$, and $R_4$ are the same or different, and each represents a hydrogen atom, an alkyl group, an aralkyl group, an aryl group, or a heterocyclic group; $R_3$ and $R_4$ may be taken together to form an alkylidene group, and $R_2$, $R_3$, and $R_4$ may be taken together to form an alkylene group; and each of these groups may have one or more substituents, wherein the pyrazolone-based compound is present in the rubber compound in an amount from about 0.1 to about 10 phr; and reinforcing filler selected from carbon black and optionally a silica, graphene, functionalized graphene, carbon nanotubes, functionalized carbon nanotubes, or mixtures thereof wherein the total amount of reinforcing filler is from about 2 to about 300 phr;

wherein in response to the reinforcing filler being solely carbon black or solely a carbon black and silica blend, the rubber composition further comprises zinc glycerolate.

2. The pneumatic tire of claim 1 wherein $R_1$ represents a hydrogen atom, $R_2$ represents a hydrogen atom or a C1-4 linear alkyl group, and $R_3$ and $R_4$ are both hydrogen atoms.

3. The pneumatic tire of claim 1 wherein the pyrazolone-based compound is a derivative of 5-pyrazolone.

4. The pneumatic tire of claim 1 wherein the pyrazolone-based compound is 3-methyl-5-pyrazolone.

5. A tire layer for a pneumatic tire, the tire layer comprising:
a rubber composition including:
100 parts of natural rubber;
a pyrazolone-based compound represented by the following Formula (1), or a salt thereof:

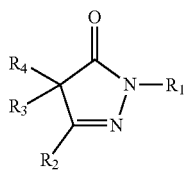

(1)

where $R_1$, $R_2$, $R_3$, and $R_4$ are the same or different, and each represents a hydrogen atom, an alkyl group, an aralkyl group, an aryl group, or a heterocyclic group; $R_3$ and $R_4$ may be taken together to form an alkylidene group, and $R_2$, $R_3$, and $R_4$ may be taken together to form an alkylene group; and each of these groups may have one or more substituents, wherein the pyrazolone-based compound is present in the rubber compound in an amount from about 1 to about 10 phr;

a processing aid represented by the following Formula (2):

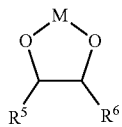

(2)

where M represents a divalent metal, and $R^5$ and $R^6$ can be the same or different and are selected from the group consisting of hydrogen atoms, alkyl groups, alkylene groups, hydroxyl substituted alkyl or alkylene groups, amine substituted alkyl or alkylene groups, and thiol substituted alkyl or alkylene groups; and reinforcing filler comprising at least carbon black, wherein the total amount of reinforcing filler is from about 2 to about 300 phr.

6. The pneumatic tire of claim 1 wherein the tire layer is a tire tread or carcass layer.

7. The pneumatic tire of claim 1 wherein the pyrazolone-based compound is present in the rubber compound in an amount from about 0.1 to about 5 phr and the reinforcing filler is present in an amount from about 10 phr to about 80 phr.

8. The pneumatic tire of claim 1 wherein in response to the reinforcing filler comprising the graphene, functionalized graphene, carbon nanotubes, functionalized carbon nanotubes, or mixtures thereof, the rubber composition further comprises a processing aid represented by the following Formula (2):

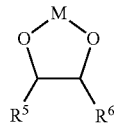

(2)

where M represents a divalent metal, and $R^5$ and $R^6$ can be the same or different and are selected from the group consisting of hydrogen atoms, alkyl groups, alkylene groups, hydroxyl substituted alkyl or alkylene groups, amine substituted alkyl or alkylene groups, and thiol substituted alkyl or alkylene groups.

9. The pneumatic tire of claim 8 wherein the processing aid is present in the rubber composition in an amount from about 1 to about 20 phr.

10. The pneumatic tire of claim 8 wherein M is selected from the group consisting of zinc, calcium, and magnesium, and $R^5$ is a hydrogen atom and $R^6$ is a hydroxyl substituted alkyl.

11. The pneumatic tire of claim 8 wherein the processing aid is zinc glycerolate.

12. The pneumatic tire of claim 5 wherein the pyrazolone-based compound is 3-methyl-5-pyrazolone.

13. The pneumatic tire of claim 5 wherein the pyrazolone-based compound is present in the rubber compound in an amount from about 0.1 to about 10 phr, the processing aid is present in the rubber composition in an amount from about 1 to about 20 phr, and the total amount of reinforcing filler is from about 2 to about 300 phr.

14. The pneumatic tire of claim 1 wherein the reinforcing filler is selected from carbon black only.

15. The tire layer of claim 5 wherein $R_1$ represents a hydrogen atom, $R_2$ represents a hydrogen atom or a C1-4 linear alkyl group, and $R_3$ and $R_4$ are both hydrogen atoms.

16. The tire layer of claim 5 wherein the processing aid is zinc glycerolate.

17. The tire layer of claim 5 comprising a tire tread or carcass layer.

18. The tire layer of claim 5, wherein M is selected from the group consisting of zinc, calcium, and magnesium, and $R^5$ is a hydrogen atom and $R^6$ is a hydroxyl substituted alkyl.

* * * * *